United States Patent
Dorairaj et al.

(10) Patent No.: US 8,575,944 B2
(45) Date of Patent: Nov. 5, 2013

(54) FOREIGN OBJECT DETECTION IN INDUCTIVE COUPLED DEVICES

(75) Inventors: Hariharakumaran Dorairaj, Ditzingen (DE); Rajeev Kumar, Coimbatore (IN); Surabhi Ganguly, Giessen (DE)

(73) Assignee: Robert Bosch GmbH, Stuttgart (DE)

( * ) Notice: Subject to any disclaimer, the term of this patent is extended or adjusted under 35 U.S.C. 154(b) by 349 days.

(21) Appl. No.: 12/915,975

(22) Filed: Oct. 29, 2010

(65) Prior Publication Data

US 2011/0128015 A1 Jun. 2, 2011

(30) Foreign Application Priority Data

Nov. 3, 2009 (IN) .......................... 2671/CHE/2009

(51) Int. Cl.
*G01R 27/04* (2006.01)
(52) U.S. Cl.
USPC ...... 324/629; 324/207.22; 324/326; 324/256; 324/176; 307/104; 307/45; 307/31; 320/108
(58) Field of Classification Search
USPC ............ 324/629, 327, 328, 329, 326; 331/65; 307/104
See application file for complete search history.

(56) References Cited

U.S. PATENT DOCUMENTS

| 7,923,870 | B2* | 4/2011 | Jin ................................ 307/140 |
| 8,004,118 | B2* | 8/2011 | Kamijo et al. ................ 307/104 |
| 2007/0228833 | A1* | 10/2007 | Stevens et al. .................. 307/45 |
| 2008/0164839 | A1* | 7/2008 | Kato et al. ..................... 320/108 |
| 2010/0087918 | A1* | 4/2010 | Vesely et al. ................. 623/2.27 |
| 2012/0175967 | A1* | 7/2012 | Dibben et al. ................. 307/104 |

FOREIGN PATENT DOCUMENTS

| WO | 2009081115 | 7/2009 |
| WO | WO 2009081115 A1 * | 7/2009 |

* cited by examiner

*Primary Examiner* — Arleen M Vazquez
*Assistant Examiner* — Thang Le
(74) *Attorney, Agent, or Firm* — Maginot, Moore & Beck

(57) ABSTRACT

A primary device for inductive power transfer to a secondary device is disclosed. The primary device includes a primary coil, the primary device being configured to (i) operate in a first mode during which the primary coil transfers power through inductive coupling to the secondary device, and (ii) operate in a second mode during which a foreign object is detected. The primary device further includes a primary controller configured to operate the primary coil (i) using a first frequency during the first mode, and (ii) using a second frequency during the second mode. A method to detect a foreign object which is in proximity of an inductively coupled environment of a primary device is also disclosed.

7 Claims, 2 Drawing Sheets

FOREIGN OBJECT DETECTION IN INDUCTIVE COUPLED DEVICES

This application claims priority under 35 U.S.C. §119 to Indian patent application no. 2671/CHE/2009, filed Nov. 3, 2009, the disclosure of which is incorporated herein by reference in its entirety.

FIELD OF THE INVENTION

This invention relates to detecting a foreign object in inductive power transfer devices.

BACKGROUND OF THE INVENTION

There are devices already available which are used to transfer power through magnetic induction. These devices normally consist of a primary unit having a primary coil. The primary coil generates a magnetic field. A secondary unit separable from the primary unit comprises a secondary coil. When the secondary coil is placed in proximity to the varying magnetic flux created by the primary coil, the varying magnetic flux induces an alternating current in the secondary coil thus transferring power inductively from the primary unit to the secondary unit. Generally, the secondary unit supplies the transferred power to an external load, for example, to a rechargeable battery. The secondary unit may be carried in host object which includes the load.

A problem in such devices is that it is generally not possible to mechanically prevent foreign objects made of metal from being placed into proximity with the primary coil and getting coupled to the primary coil. The varying magnetic field in the primary coil may induce current in the foreign objects made of metal. Such currents may cause power losses that may also cause heating of the object.

There are already different methods available to detect a foreign object placed in the proximity of the above devices. For example, WO2009081115 discloses such a device and method to detect a foreign object in the inductively coupled devices.

SUMMARY OF THE INVENTION

The disclosure proposes a method to detect a foreign object without causing much power losses in the primary unit by using a higher frequency during the detection of a foreign object.

Switching to a frequency during the detection of the foreign object which corresponds to a point where the current curve for minimum air gap meets the current curve for a maximum air gap has the advantage that a single threshold can be used to detect the presence of a foreign object irrespective of the amount of air gap.

According to one embodiment of the disclosure, there is provided a primary device for inductive power transfer to a secondary device. The primary device includes a primary coil, the primary device being configured to (i) operate in a first mode during which the primary coil transfers power through inductive coupling to the secondary device, and (ii) operate in a second mode during which a foreign object is detected. The primary device further includes a primary controller configured to operate the primary coil (i) using a first frequency during the first mode, and (ii) using a second frequency during the second mode.

According to another embodiment of the disclosure, there is provided a method to detect a foreign object which is in proximity of an inductively coupled environment of a primary device. The method includes connecting a load to a secondary device and operating a primary coil of the primary device using a first frequency during a power transfer mode. The method also includes disconnecting the load from the secondary device and operating the primary coil using a second frequency during a measurement mode, the second frequency being the point where a first current curve corresponding to a minimum air gap between the primary device and the secondary device meets a second current curve corresponding to a maximum air gap between the primary device and the secondary device. In addition, the method includes measuring the primary current during the measurement mode so as to sense a measured current. the method further includes detecting whether a foreign object is present by comparing the measured current with a set threshold.

DESCRIPTION OF THE INVENTION

Figure 1:
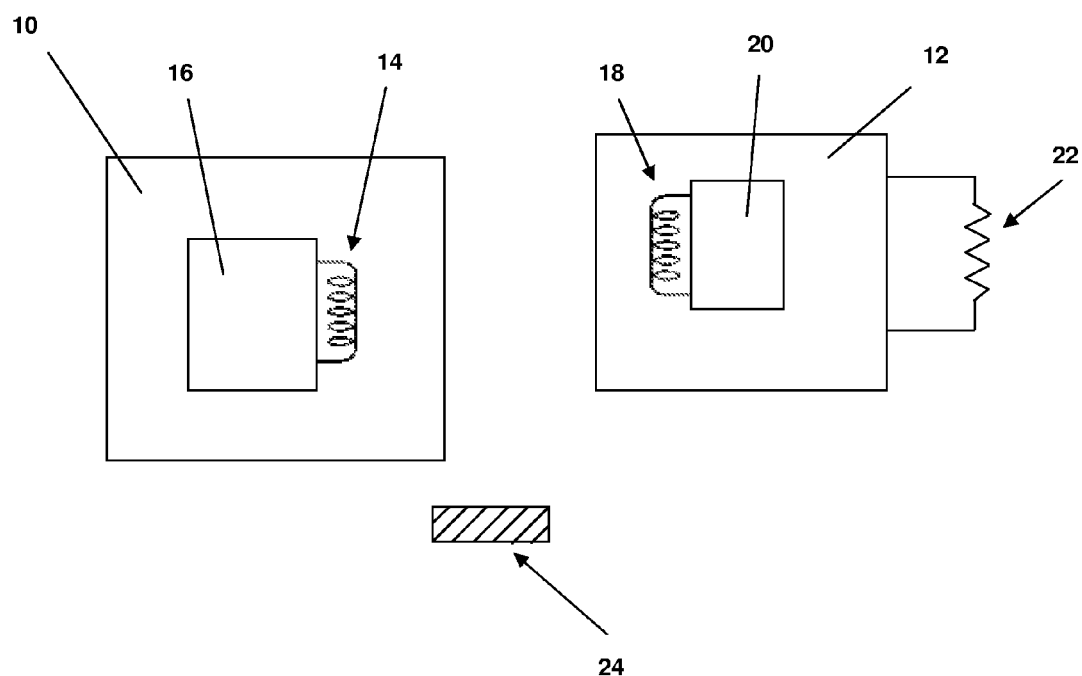
FIG. 1 shows a schematic diagram of a circuit that incorporates the features of the present invention therein.

Shown in FIG. 1 is a primary device 10 and a secondary device 12 inductively coupled to each other. The primary device 10 and the secondary device 12 are physically separable. The primary device 10 comprises a primary coil 14 and a primary control means 16. The secondary device 12 comprises a secondary coil 18 and a secondary control means 20. The primary control means 16 drives the primary coil 14 to transfer power through induction to the secondary coil 18 when the secondary coil 18 is within the proximity of the primary coil 14.

The primary control means 16 uses different frequencies for driving the primary coil to generate enough power in the secondary coil 18 depending upon the conditions of a load 22 connected to the secondary device 12. For this purpose the primary and the secondary coils use a predefined protocol.

On switching on, the primary control means 16 uses a default frequency to drive the primary coil 14 causing the induction of current in the secondary coil 18. The secondary control means 20 checks whether enough power is being generated in the secondary coil 18. If the power generated in the secondary coil 18 is not enough, the secondary control means 20 sends a feedback to the primary device 10 to increase the power delivered. The primary control means 16 decreases the operating frequency of the primary coil 14. The frequency is lowered so that the current induced in the primary coil 14 increases, thereby increasing the power delivered to the secondary coil 18. Once a required level of power transfer is achieved, the secondary control means 20 sends a feedback to the primary device 10 to maintain the power transfer at the present level.

The feedback from the secondary device to the primary device 12 is communicated by using a predefined protocol. The protocol involves predefined bit streams to be sent by the secondary device 12 to the primary device 10, the bit streams generated by the secondary device 12 by connecting and disconnecting the load 22. The connection and disconnection of the load results in the variations of the primary current. The variations in the primary current are decoded by the primary control means as a 0s and 1s. By decoding the bit stream of 0s and 1s, the primary control means 16 decodes the message sent by the secondary device 12.

If any foreign object 24 made of metal is placed in the proximity of the primary device 10, current is induced into the foreign object 24. This results in heating of the foreign object and damages the foreign object and may cause fire accident. Also this results in unnecessary losses. The primary device 10 should be in a position to detect any foreign object present in its proximity. The checks to detect foreign object is carried out at regular intervals.

The power transfer comprises charging windows during which the load is connected to the secondary device and measuring windows during which the load is disconnected from the secondary device 12. Measuring window is used by the primary and the secondary devices to check whether any foreign object is present in the proximity.

During the charging window as the load is connected to the secondary device 12, the primary current will have a value I1. During the measuring window, as the load is disconnected the primary current will have a value I2.

If the secondary device is not present within the proximity of the primary device, there will be no feedback from the secondary device to primary device. The primary device keeps checking at regular intervals whether the secondary device is present. Once the secondary device is detected within the proximity, the primary and secondary devices enter into charging mode and measuring mode.

By measuring the primary current during the measuring window, the primary device can determine whether a foreign object is present or absent in the proximity.

For example, let us consider a case where neither a foreign object nor a secondary device is present in the proximity of the primary coil. Under this condition, the value of the primary current will be I2. The I2 indicates the absence of any load or any foreign object which draws the power.

When only a secondary device is present in the proximity of the primary device, during the measuring window, the secondary device disconnects the load from the secondary coil. Under this condition, the primary current will have a value I2. The I2 indicates the absence of any load or any foreign object which draws the power.

When only a foreign object is present in the proximity of the primary device, the foreign object continues to get the induced currents, thereby changing the primary current. Under this condition, the primary current has a value higher than I2. The value higher than I2 indicates the presence of a foreign object. Once a foreign object is detected, the primary control means can take some measures to avoid damage to the foreign object and also to avoid the losses.

Let us consider a case where a foreign object is present in the proximity of the primary device along with the secondary device. In this case the foreign object also gets induced currents. During the measuring window, the secondary device disconnects the load from the secondary coil. But the foreign object continues to get the induced currents thereby changing the primary current. Under this condition, the primary current will have a value higher than I2. The value of the primary current indicates the presence of a foreign object. Once a foreign object is detected, the primary control means can take some measures to avoid damage to the foreign object and also to avoid the losses.

The value of the I2 which is the current at no load varies depending upon the air gap between the primary and the secondary coils. So it is not possible to have one threshold to compare with I2 to detect whether a foreign object is present or not. Under such conditions, the primary device needs to have a set of thresholds for current for different air gaps or alternatively the primary unit has to use a threshold which has to take care of a worst case measurement of I2. The disadvantage of having a set of thresholds is that, first the primary device 10 needs to find out the air gap to use the right threshold to compare the I2 with. This will make the method of detecting a foreign object very complex. The other method of using a large threshold which has to take care of a worst case measurement of I2 has a disadvantage that under some cases the primary device 10 may fail to detect a foreign object because of the large threshold value.

For Example:

The primary device is operating at 70 kHz. At 1 mm Air gap the no load state input current measured in the primary device is 0.3 A.

At 10 mm air gap the no load state input current measured is 0.45 A.

In the prior arts, the threshold of the current to compare the read current is kept at 0.45 A for 70 KHz in order to detect the foreign object taking into account that the air gap may vary from 1 mm to 10 mm.

At 1 mm air gap between coils, if a foreign object is partially exposed, it may not be possible to detect the foreign object as the current measured may not be comparable to the threshold set.

The disclosure proposes a method to overcome the above mentioned problems.

Figure 2:
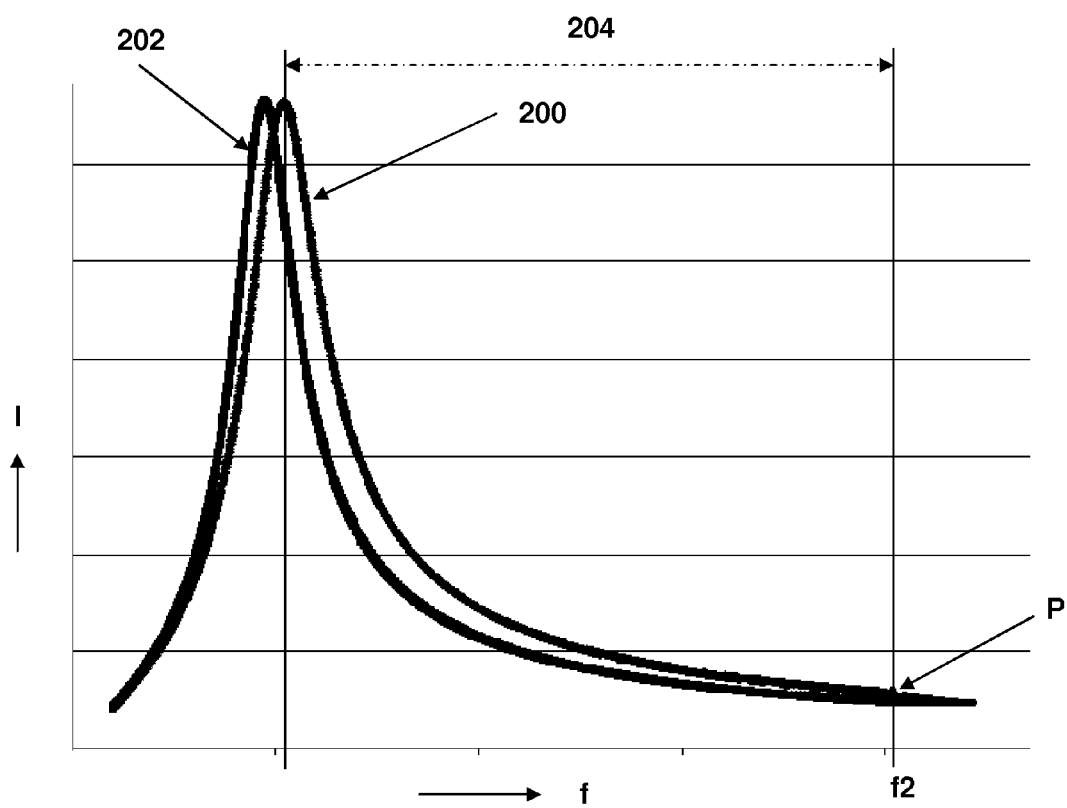
FIG. 2 shows a graph comparing current and frequency.

The current in the primary device varies with the frequency. The current also varies as the air gap varies. Shown in FIG. 2 are two current waveforms, the X axis representing the frequency and the Y axis representing the current. The waveform 200 corresponds to the current for a minimum air gap between the primary device and the secondary device. The waveform 202 corresponds to the current for a maximum air gap between the primary device and the secondary device. It is observed that both the waveforms meet at a point P where the frequency is represented as f2. If the frequency f2 is used during the measuring window, the value of the current at P remains same independent of the air gap. By using the value of the current at P, as a threshold value to compare with the read current I2 during the measurement window, the primary device can unambiguously detect the presence of a foreign object irrespective of the air gap.

One more advantage of using the frequency f2 during the measuring window is that at higher frequencies, the current in the primary is less. As the current is less, the losses are also less.

According to the invention, if the operating frequency of the primary device 10 is set to the frequency f2, then the current in the primary device does not vary with respect to the air gap.

According to the invention, during the charging window the primary control means 16 drives the primary coil 14 with a frequency f1 in the operating range of frequencies represented by 204, depending upon the operating conditions of the secondary device 12. The frequency f1 is so selected that enough power is generated in the secondary coil 18 to transfer to the load 22. During the measuring window the secondary control means 20 disconnects the load 22. During the measuring window the primary control means 16 switches the operating frequency to f2.

As the two current waveforms meet at point P, the value of the current at point P is used as threshold to compare the read current I2 during the measuring window. As the threshold corresponding to point P is more accurate and independent of the air gap between the coils, using this threshold will help in detecting the foreign object irrespective of the width of the air gap between the primary and secondary coils. Also the foreign object is detected even if it is exposed partially because the threshold set is more accurate.

What is claimed is:

1. A primary device for inductive power transfer to a secondary device, the primary device comprising:
    a primary coil, the primary device being configured to (i) operate in a first mode during which the primary coil transfers power through inductive coupling to the secondary device and a load is connected to the secondary device, the secondary device being configured to supply the transferred power to the load, and (ii) operate in a second mode during which the load is disconnected from the secondary device and a foreign object is detected; and
    a primary controller configured to operate the primary coil (i) using a first frequency during the first mode while the load is connected to the secondary device, and (ii) using a second frequency during the second mode while the load is disconnected from the secondary device;
    wherein the primary device is configured to measure a primary current in the primary device while the primary coil is being operated at the second frequency during the second mode to detect presence or absence of the foreign object, and
    wherein the secondary frequency corresponds to an operating frequency at which the primary current does not vary with respect to an air gap between the primary coil and a secondary coil of the secondary device.

2. A primary device according to claim 1 wherein the primary controller is configured to select the first frequency based upon feedback from the secondary device.

3. A primary device according to claim 1 wherein the primary device is configured to transfer power during the first mode from the primary device to the secondary device to charge the load.

4. A primary device according to claim 1 wherein the second frequency corresponds to a point where a first current curve corresponding to a minimum air gap between the primary device and the secondary device meets a second current curve corresponding to a maximum air gap between the primary device and the secondary device.

5. A primary device according to claim 4 wherein the current corresponding to the point is used as a threshold to compare with the input current in the primary device to determine whether the foreign object is within the proximity of the primary device.

6. A method to detect a foreign object which is in proximity of an inductively coupled environment of a primary device, comprising:
    connecting a load to a secondary device and operating a primary coil of the primary device using a first frequency during a power transfer mode;
    disconnecting the load from the secondary device;
    after disconnecting the load from the secondary device, operating the primary coil using a second frequency during a measurement mode, the second frequency being the point where a first current curve corresponding to a minimum air gap between the primary device and the secondary device meets a second current curve corresponding to a maximum air gap between the primary device and the secondary device;
    measuring the primary current during the measurement mode while operating the primary coil at the second frequency so as to sense a measured current; and
    detecting whether a foreign object is present by comparing the measured current with a set threshold.

7. A method to detect a foreign object according to claim 6 wherein the first frequency is selected based on feedback from the secondary device.

* * * * *